United States Patent [19]
Stadelmann

[11] 3,766,342
[45] Oct. 16, 1973

[54] SWITCH RESPONSIVE TO BRAKE PEDAL MOVEMENT

[75] Inventor: Joachim P. Stadelmann, Madison Heights, Mich.

[73] Assignee: Chrysler Corporation, Highland Park, Mich.

[22] Filed: May 26, 1972

[21] Appl. No.: 257,218

[52] U.S. Cl. ........ 200/61.89, 200/153 V, 200/166 J, 340/69
[51] Int. Cl. ............................................ H01h 3/14
[58] Field of Search ................... 200/61.89, 153 V, 200/166 J, 61.87, 86.5, 153 C; 340/69, 52 B

[56] References Cited
UNITED STATES PATENTS

| | | |
|---|---|---|
| 3,439,323 | 4/1969 | Kersting ........................... 340/69 X |
| 3,390,243 | 6/1968 | Obermann ........................ 200/166 J |
| 3,581,028 | 5/1971 | Valbona ....................... 200/166 J X |
| 3,219,775 | 11/1965 | Carpenter ........................ 200/61.89 |
| 3,419,115 | 12/1968 | Glenn ......................... 200/61.89 X |

Primary Examiner—Robert K. Schaefer
Assistant Examiner—Robert A. Vanderhye
Attorney—Russel C. Wells

[57] ABSTRACT

A pressure responsive switch inserted in the linkage of a vehicle braking system for responding only to the actual pressure required to initiate braking. The switch mechanism is self adjusting to its actuating means and is unaffected by the subsequent wear of the brake lining and linkage over the life of the vehicle. Extremely fast contact operation and reliability are possible due to the mechanical advantage of the actuator lever ratio and contact configuration.

8 Claims, 8 Drawing Figures

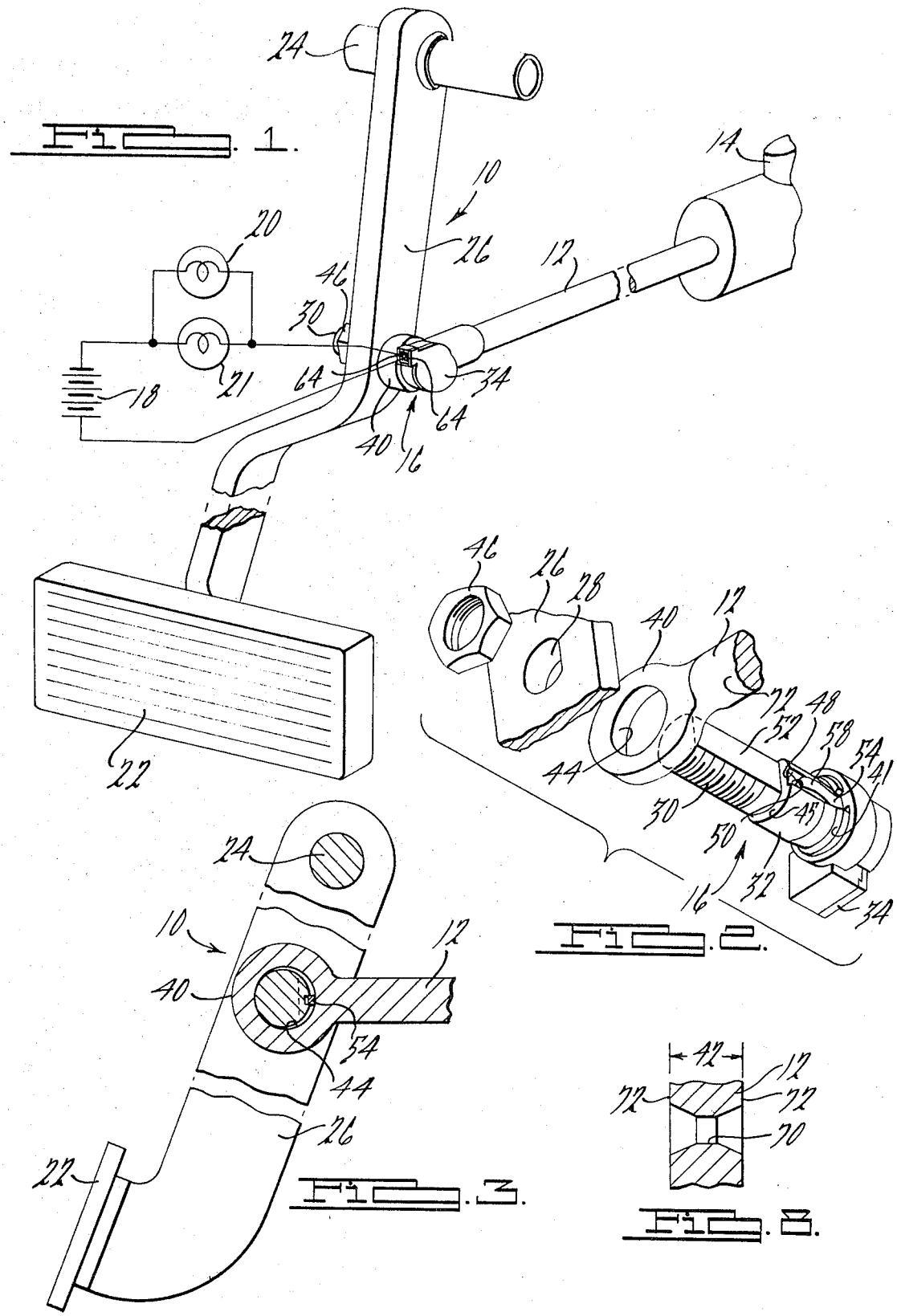

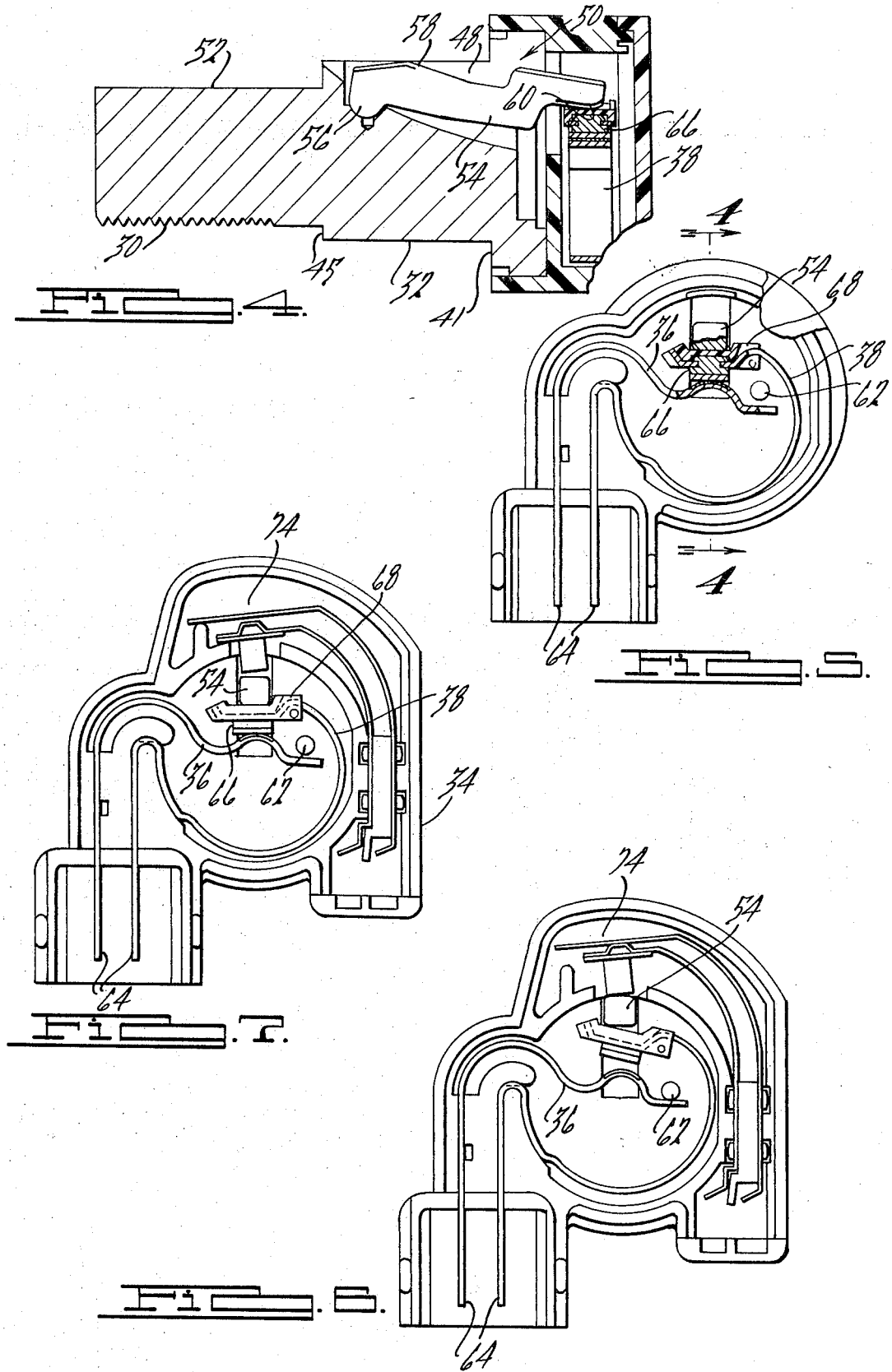

SWITCH RESPONSIVE TO BRAKE PEDAL MOVEMENT

BACKGROUND OF INVENTION

1. Field of Invention

This invention relates to switch mechanisms in general and more particularly to a pressure responsive switch.

2. Prior Art

Vehicle braking systems typically employ mechanical switches which are fastened to the structure of the vehicle in operative contact with the brake pedal for indicating the depression of the brake pedal. Whenever the brake pedal is depressed, the switch closes thereby illuminating the stop lights.

Other systems employ fluid pressure switches which are generally connected in the hydraulic lines and are responsive to pressure changes for actuation. Occasionally fluid leaks develop around the switch mounting resulting in loss of fluid and failure of the braking system.

Still other systems employ in-line mechanical switches constituting an operative connection in the mechanical linkage of the brake systems. Generally, such switches are mounted for movement with the linkage therefore requiring heavy actuating pressures.

All of the above systems require either a form of adjustment both when initially assemblying the switch in the system and during the life of the system because of linkage wear or provide an additional weak link in the braking system. This involved both labor and additional supporting structure which when multiplied by the number of automobiles built in a given period of time produce a large dollar expense.

In addition, typically, the slight pressure applied to a brake pedal by a driver through the inadvertent act of resting his foot on the brake pedal has caused the switch to be actuated but the brake system not energized. This gives a false warning to the following vehicles thereby destroying the safety value of the stop light. Additionally, such switches as hereinabove described are slow acting and in terms of the adverse electrical conditions, namely the electrical load, switch failure due to contact erosion is common.

SUMMARY OF THE INVENTION

It is a principal object of this invention to provide a non-adjusting switch responsive to a predetermined pressure applied to the switch actuator.

It is another object of this invention to provide a switch mechanism with increased contact actuation speed.

It is still another object of this invention to provide a switch mechanism requiring a predetermined amount of force for actuation and is undamaged and unaffected by forces exceeding the desired force.

In accordance with these and other objects there is described herein for use in a vehicle fluid braking system having a master cylinder, a pressure responsive switch mechanism. Located on the brake pedal means which initiates the braking system is an aperture having a predetermined shape for orientating a fastening means with respect to the vehicle. A push rod extending from the master cylinder or booster responds to the arcuate motion of the pedal means to translate said arcuate motion into linear motion for operation of the master cylinder. The push rod has an eyelet end through which the fastening means is inserted for interconnecting the push rod and the pedal means in a pivotable connection. The fastening means, which is the preferred embodiment in a modified shoulder bolt has an axially extending slot extending the length of the shoulder. At the end of the slot adjacent to the threaded portion of the fastening means is a spherical bearing seat for receiving the spherical pivoting end of an elongated switch actuator. The actuator extends beyond the length of the slot and is in operative contact with one contact arm of a switch. The one contact arm biases the actuator in a radially outward direction in the normal position thereby applying a preload to the switch. Intermediate the ends of the actuator is a camming surface for receiving the force created by the movement of the pedal means relative to the push rod. This force is applied by the actuator to the one contact of the switch for actuating the switch.

BRIEF DESCRIPTION OF THE DRAWINGS

The above mentioned and other objects will become apparent in the following detailed description and in the accompanying drawings in which:

FIG. 1 is a perspective view of the brake pedal assembly and a portion of a fluid brake system including a portion of an electrical schematic;

FIG. 2 is an exploded perspective view of the switch mechanism in the assembly of FIG. 1;

FIG. 3 is a side view of pedal and push rod interconnection of FIG. 1 illustrating the normal position of the actuator;

FIG. 4 is an axial sectional view of the normal position of the actuator and fastening means;

FIG. 5 is an end view of the switch assembly illustrated in the actuated position;

FIG. 6 is a modification of the switch assembly illustrating a complementary switching arrangement in the normal position;

FIG. 7 is the modification of FIG. 6 illustrated in the actuated position;

FIG. 8 is a modification of the aperture in the push rod for receiving the fastening means.

DETAILED DESCRIPTION

Referring to the figures by the characters of reference, there is illustrated in FIG. 1 a portion of a vehicle braking system. A brake pedal means 10 is operatively connected by means of a fastener-switch 16 to a push rod 12 which is connected to a master cylinder or booster 14 for actuating the vehicle brakes (not shown). The switch is in an electrical circuit with a source of power such as a battery 18 and a pair of parallelly connected stop lights 20 and 21. When the operator presses on the brake pedal 22 which moves in an arcuate path about a pivot member 24, the force he applies is transferred by means of the push rod 12 to the master cylinder 14. The switch in response to the movement of the brake pedal 22 closes the circuit between the battery 18 and the stop lights 20 and 21 thereby illuminating the stop lights. The push rod 12 translates the arcuate movement of the pedal 22 into linear movement for operating the piston, not shown, inside the master cylinder 14.

FIG. 2 illustrates the interconnection between the brake pedal arm 26 and the push rod 12 by the fastener-switch 16 of the present invention. The brake pedal arm 26 has a "D" shaped aperture 28 for locating or orientating the position of the fastener-switch 16 relative to the push rod 12. The fastener comprises a threaded portion 30 having a "D" shaped cross-section similar to that of the aperture 28 in the brake arm 26 and a cylindrical portion 32 immediately adjacent to the threaded portion. Attached adjacent to the cylindrical portion 32 is a switch housing 34 containing a pair of switch members 36 and 38 as illustrated in FIGS. 5-7. The fastener-switch 16 is inserted through the eyelet portion 40 of the push rod 12 and into the "D" shaped aperture 28 of the brake arm 26 with the push rod 12 bearing on the cylindrical portion 32 of the fastener-switch 16 limiting against a shoulder 41. The axial length of the cylindrical portion 32 is approximately equal to the thickness 42 of the push rod 12 and the diameter of the aperture 44 in the push rod is somewhat greater than the diameter of the cylindrical portion 32. The brake arm 26 slides on the "D" shaped threaded portion 30 limiting against a shoulder 45 and is secured thereto by a nut 46. The flat portion of the "D" shaped aperture 28 in the brake pedal arm 26 is orientated to be substantially normal to the direction of the axial length of the push rod 12.

As illustrated in FIG. 2 and in greater detail in FIG. 4, a slot or trough 50 is formed in the cylindrical portion 32 wherein the sidewalls of the slot are normal to the flat surface 52 of the "D" shaped threaded portion 30. Thus, when the fastener 16 is inserted, as illustrated in FIG. 3, the sidewalls 48 of the slot 50 are substantially parallel to the axial length of the push rod 12. The function of the sidewalls of the slot is to provide clearance for an actuator 54 in its movement as will hereinafter be described.

Located in the slot 50 of the fastener 16 is the switch actuator 54 having a spherical pivoting end 56, a camming surface 58 and an actuating end 60. The actuator 54 is arranged as a third class lever wherein the forces are applied to the camming surface 58 intermediate the ends of the actuator 54. As illustrated in FIG. 4, the normal position of the actuator 54, the camming surface 58 extends beyond the cylindrical portion 32 diameter and the actuating end 60 extends axially beyond the axial end of the cylindrical portion. The radius of the camming surface 58 is substantially identical to that of the radius of the aperture 44 in the push rod 12.

As illustrated in FIGS. 5-7, the switch mechanism comprises a pair of switch members or arms 36 and 38 wherein the first switch member 36 is limited in its upward or outward direction with reference to the figures by a fixed stop 62 in the housing 34. Upon actuation, this switch member 36 is resilient and will deflect downward. The second switch member 38 is radially spaced from the first switch member 36 and in operative alignment therewith is also a resilient member and is limited in its outward or radial movement by the actuating end 60 of the actuator 54 biasing the actuator 54 in the normal position as indicated in FIG. 4. The biasing force of the second switch member 38 places a pre-loaded condition on the actuator as determined by the spring rate of the switch member. As illustrated in FIG. 5, when the switch is actuated, the second switch member 38 moves into slideable engagement with the first switch member 36 and both members are deflected downwardly by the actuating end 60 of the actuator 54.

At one end of each of the two switch members 36 and 38 is a means 64 for securing wires by either a mechanical connection or by soldering. The contact areas of the two switch members 36 and 38 are plated for maximal electrical contact life and operation. The second switch member 38 has a contact rivet 66 secured thereto which is insulated from the actuator 54 by the insulating member 68. The insulated member 68 also functions as a low frictional surface permitting the contact arm to slide along the actuating surface 60 of the actuator 54 as the actuator 54 moves vertically in the slot 50.

Referring to FIG. 3, when the fastener-switch 16 is orientated in the "D" shaped aperture 28 of the brake arm 26, the camming surface 58 of the actuator 54 is substantially normal to the axial length of the push rod 12. Due to the diametrical difference between the cylindrical portion 32 and the aperture 44 in the push rod, the camming surface 58 of the actuator remains extended beyond the surface of the cylindrical portion in the normal condition. The spring biasing pressure from the second switch member 38 holding the actuator 54 in its normal position additionally pre-loads the pedal arm 26 providing stand-by pressure on the brake pedal 22.

By proper lengths or distances between the pivot 56 and the point of applying the force to the camming surface 58 of the actuator 54 and between the pivot 56 and the actuating end 60, the biasing force of the second switch member 38 is multiplied thus permitting a lower spring rate for the second switch member 38 while maintaining a desired force between the brake arm 26 and the push rod 12. In the preferred embodiment these lengths are in the ratio 1:5 therefore the spring rate of the second switch member 38 is one-fifth of the pressure applied to the camming surface 48 due to the relative movement between the brake arm and the push rod.

For allowing a certain amount of misalignment between the push rod 12 and the cylindrical portion 32, either the cylindrical portion 32 of the fastener is slightly barrel shaped or the aperture 44 in the push rod 12 has a cross-sectional shape such as that illustrated in FIG. 8. The desired diameter of the aperture 44 is held over the central portion 70 of the cross-sectional area of the aperture 44 with a slight conical lead angle diverging therefrom to both broadsides 72 of the push rod. This functions to maintain the pressure at the same point of the camming surface 58 of the actuator 54 regardless of the alignment of the push rod 12 to the brake pedal arm 26.

Referring to FIGS. 6 and 7, there is illustrated a modification of the basic switch as hereinabove described. In particular, this modification provides a pair of sequencing switches within the same housing, each operated by the same actuator arm. In FIG. 6 there is illustrated the normal condition of the modified switch mechanism wherein a second switch 74 is positioned radially in line with the first switch comprising the two switch members 36 and 38 and on the outward side of the actuator 54. In this particular modification, the switch 74 is illustrated in a normally closed position. As the actuator arm 54 is pivoted about its spherical pivot 56, this second switch 74 is opened in a timed sequence before the first switch is closed. This is illustrated in FIG. 7 where the second switch 74 is shown fully opened and the first switch is closed. An application of such a dual switch mechanism may be where the second switch member controls an automatic speed control device in a vehicle which must be disabled before the first switch is closed in response to the depression of the brake pedal 22.

OPERATION

In the normal position as illustrated in FIGS. 3 and 4, the camming portion 58 of the actuator 54 extends radially beyond the diameter of the cylindrical portions 32 and limits against the wall of the aperture 44. As previously indicated, the spring rate of the second switch member 38 biases the actuator in this position. The spaced relationship between the push rod 12 and the brake pedal arm 26 is maintained by a force equal to the mechanical advantage developed by the actuator 54 multiplied by the biasing force of the switch member 38. This in effect removes the free play at the foot pedal 22 and provides a resistance to the inadvertent resting of the operator's foot on the pedal 22 and the resultant false indication of the brake being applied.

As the operator pivots the brake pedal, the relative movement between the brake pedal arm 26 and the push rod 12 causes the actuator to rotate about its pivot 56. Before the camming surface is flush with the diameter of the cylindrical portion 32, the first and second switch members are in contact with one another. When the camming surface is flush with the diameter of the cylindrical portion, the switch members are in full electrical contact and further rotation of the pedal 22 will not apply any more force to the switch actuator 54.

When the operator releases his foot from the pedal 22, the biasing force of second switch member 38 causes the actuator to be returned to its normal postion and the switch contacts are quickly released. Quick release of the contacts reduces the erosion of the contacts thereby increasing the reliability of the switch.

There has just been shown and described a pressure responsive switch for use in braking systems of vehicles. The switch is contained within a fastener connecting the brake pedal arm and the push rod. The push rod in response to the brake pedal actuates the master cylinder or booster of the braking system. Upon a predetermined amount of pressure applied to the brake for the purpose of braking the vehicle, the switch is actuated closing the circuit to the stop lights at the rear of the vehicle for indicating actuation of the brake system.

What is claimed is:

1. A pressure responsive switch responsive to pressure applied by the relative movement between interconnecting members at their point of interconnection,
    a housing having a fastening portion and a smooth cylindrical shoulder portion adjacent thereto for pivotally interconnecting the members around said shoulder portion, said shoulder portion having an axially extending slot extending from one end thereof toward said fastening portion;
    a first switch member operatively coupled to said one end of said housing, said member biased in a normal position;
    a second switch member spaced from said first switch member in operative alignment therewith in said normal position and operable to be slideably engaged with said first switch member in an actuated position; and
    an actuating member pivotally mounted at one end thereof in said slot of said housing and extending toward and beyond said one end of said housing to be in operative contact with said second switch member and biased radially outward thereby in said normal position, said actuating member responsive to pressure applied intermediate its ends from the relative movement of the interconnecting members for displacing said second switch member into a slideable engagement with said first switch member in said actuated position.

2. In a vehicle braking system having a master cylinder means, a pressure responsive switch comprising:
    pedal means pivotally mounted in said vehicle for manually initiating the braking system, said pedal means having a predetermined shaped aperture therein;
    push rod means having an eyelet end with an aperture therein, said push rod means for translating the arcuate motion of said pedal means into linear motion for actuation of the master cylinder means;
    fastening means for interconnecting said pedal means and said push rod means having a cylindrical portion with an axially extending slot therealong and a threaded portion adjacent thereto, said threaded portion extending through said aperture in said pedal means and said cylindrical portion extending through said aperture in said push rod limiting against said pedal means;
    switch means mounted on the end of said fastening means adjacent to said cylindrical portion; and
    an elongated switch actuator pivotally mounted at one end thereof in said slot adjacent said threaded portion and extending along said slot beyond the end of said fastening means in operative contact with said switch means, said actuator pivoting in response to a predetermined pressure applied at a point intermediate the ends thereof by the relative movement of said pedal means and said push rod for actuating said switch means.

3. A pressure responsive switch according to claim 2 wherein said switch means comprises:
    a first switch member biased in a normal position, and
    a second switch member spaced from said first switch member and in operative alignment therewith, and second switch member biasing said actuator in a radially outward direction in a normal position and responsive to the pressure applied to said actuator by the relative movement of said pedal means and said push rod means for slideably engaging said first switch member.

4. A pressure responsive switch according to claim 3 further comprising insulation means between said actuator and said second switch member for electrically insulating said actuator from the electrical signals carried by said second switch member and for providing a low coefficient of friction between said second switch member and said actuator when said actuator is being pivoted.

5. A pressure responsive switch according to claim 3 further comprising:
    a second switch means responsive to the movement of said actuator and operative to be actuated in timed sequence before the actuation of the other said switch means.

6. A pressure responsive switch according to claim 2 wherein the diameter of the cylindrical portion of said fastening means is less than the diameter of the aperture in the eyelet end of said push rod whereby said actuator extends beyond the surface of said cylindrical portion when said push rod means and said pedal means are in their normal position and said actuator is substantially flush with said surface of said cylindrical portions when said pedal means moves relative to said push rod means.

7. A pressure responsive switch according to claim 2 wherein said predetermined shaped aperture in said pedal means is a "D" shaped aperture having the flat portion of said aperture substantially normal to the axial length of said push rod and the threaded portion of said fastening means has a corresponding "D" shaped cross-section for aligning said fastener in a predetermined relationship with said pedal means.

8. In a pressure responsive switch according to claim 7 wherein the side walls of said axially extending slot in said fastener means are parallel to each other and normal to the flat plane of said "D" shaped threaded portion.

* * * * *